Figure 1:
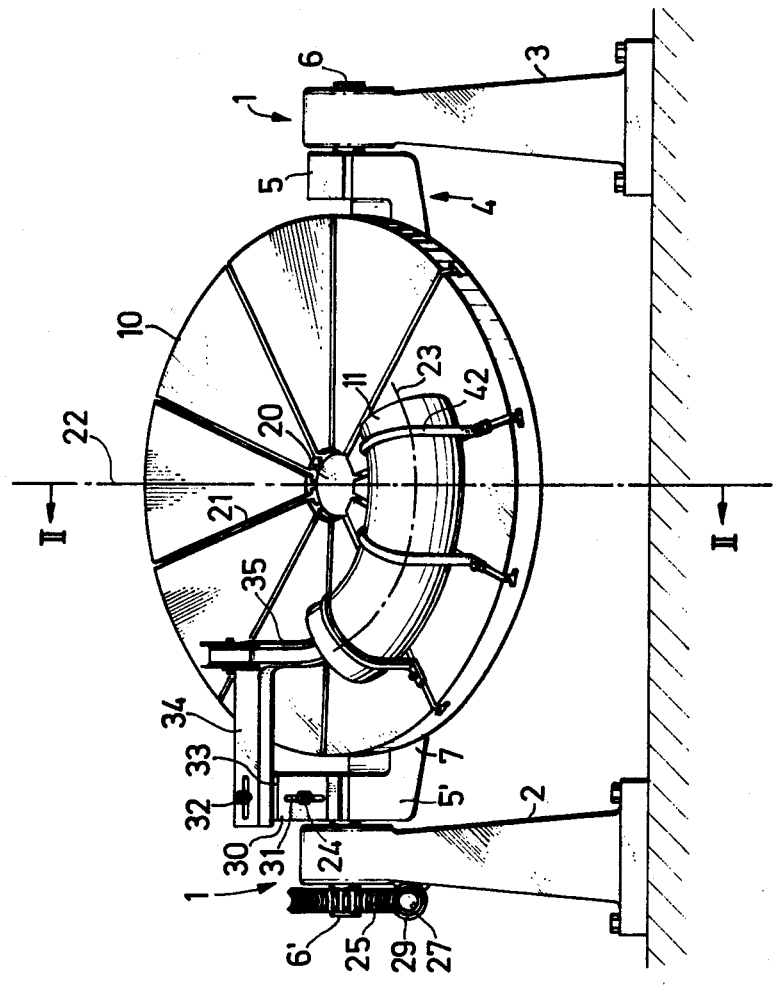

United States Patent [19]

Ludwig

[11] 4,165,245

[45] Aug. 21, 1979

[54] METHOD FOR THE FABRICATION OF INTERNALLY WELD-CLADDED PIPE ELBOWS

[75] Inventor: Alfred Ludwig, Winterthur, Switzerland

[73] Assignee: Sulzer Brothers Limited, Winterthur, Switzerland

[21] Appl. No.: 865,155

[22] Filed: Dec. 28, 1977

[30] Foreign Application Priority Data

Jan. 10, 1977 [CH] Switzerland .......................... 238/77

[51] Int. Cl.² ............................................. C21D 1/00
[52] U.S. Cl. .................................... 148/127; 148/130
[58] Field of Search ............... 148/127, 11.5 Q, 13 R, 148/2, 3, 130; 29/463, 157 A

[56] References Cited

U.S. PATENT DOCUMENTS

| | | | |
|---|---|---|---|
| 2,325,113 | 7/1943 | Craig | 148/127 |
| 3,550,253 | 12/1970 | Frey | 29/463 |
| 3,751,308 | 8/1973 | Bishop et al. | 148/127 |
| 3,833,985 | 9/1974 | Curry | 29/157 A |
| 4,043,167 | 8/1977 | Koser | 29/157 A |

*Primary Examiner*—L. Dewayne Rutledge
*Assistant Examiner*—Peter K. Skiff
*Attorney, Agent, or Firm*—Kenyon & Kenyon

[57] ABSTRACT

The weld-cladding apparatus includes a turntable which is rotatably mounted in a yoke about a horizontal axis. An outrigger is mounted on the yoke and has a curvature coincident to the curvature of the torus-to-be-cladded and a center of curvature on the axis of the turntable. The weld-cladding means is rotatably mounted at the end of the outrigger in a vertical plane common to the plane in which the pivot axis of the turntable moves during rotation of the yoke. During use, the weld-cladding means remains vertical while the turntable pivots on the horizontal axis. In order to form a weld, the turntable is oscillated back and forth about the pivot axis over an arcuate length equal to the length of the torus. The turntable is tilted incrementally a distance equal to the width of a weld.

2 Claims, 2 Drawing Figures

METHOD FOR THE FABRICATION OF INTERNALLY WELD-CLADDED PIPE ELBOWS

This invention relates to a method for the fabrication of internally weld-cladded toroidal bodies such as pipe elbows.

As is known, large pipe elbows generally consist of relatively thick ferritic base structures for reasons of strength and economy and are provided on the inside with austenitic weld-cladding for protection against corrosion. In order to produce such elbows, flat sheets are generally hot-pressed in a die to form torus-sector half-shells. These half-shells are then heat treated and machined at the edges. Next, the half-shells are cladded internally and subsequently welded together in two longitudinal seams. The welding operation is usually accomplished from the outside in the following manner. First, the austenitic cladding layers which protrude at the seam location in the outermost material layer, i.e, in the innermost layer of the half-shells, beyond the base material are welded tight by means of the TIG (tungsten inert gas) method. Next, the entire thickness of several millimeters of the cladding layer is filled by means of an austenitic welding material (Arosto 347).

In order to prevent carburization of the austenitic layer during a subsequent welding together of the ferritic base structures, it has been necessary to lay down a so-called Kardo seam as an insulating layer. Such a seam consists of very low carbon material, the composition of which, for example, reads in percent by weight: C—0.01; Mo—0.05; Si—0.05; Cu—0.045; P—0.01; S—0.08 and the remainder iron (Fe). This Kardo seam protrudes outwardly beyond the cladding layer by a few millimeters, for example, three millimeters and thus extends substantially into the base structure at the seam location of the half-shells to be welded. This Kardo seam has thereafter been followed by at least one manual seam of ferritic welding material. Thereafter, the seam location is filled up, preferably by a submerged arc welding technique.

However, the Kardo seam which protrudes into the ferritic base material represents a discontinuity in the strength of the pipe elbow and must be taken into consideration in designing the wall thickness.

Further, in the known processes for joining the half-shells, the cross-section is generally distorted so heavily that the structure must also be straightened out afterwards. However, during this straightening process, elongations and stresses are introduced. This can lead, in a subsequent annealing operation, to structure changes wherein detrimental brittle fracture properties can occur due to the formation of a coarse grain.

Accordingly, it is an object of the invention to improve the construction of large toroidal bodies.

It is another object of the invention to improve the brittle fracture behavior of a large pipe elbow formed of half-shells which are welded together.

It is another object of the invention to avoid the need for a Kardo seam in welding two half-shells together to form a toroidal body.

Briefly, the invention provides a method for internally weld-cladding toroidal bodies such as pipe elbows.

The method comprises the steps of forming a pair of torus-sector half-shells, machining the edges of each half-shell, subsequently welding the half-shells together into a toroidal body and straightening and heat treating the toroidal body. Thereafter, the invention employs the steps of applying a weld-clad along tangential generatrix lines on the inside of the toroidal body and subsequently stress-annealing the weld-cladded toroidal body.

The method thus welds the half-shells prior to being weld-cladded. As a result, the Kardo seam described above can be omitted so that the discontinuities of strength mentioned above no longer occur. In addition, any coarse grain which may have formed when the welded-together toroidal body is straightened out can be made a fine grain again in the subsequent stress-annealing step. This has not been possible with the previously known fabrication methods as described above since the already clad torus bodies must not be exposed to a high heat treatment temperature because this would lead to detrimental carburization of the austenitic cladding layer.

The heat treatment which is used includes an annealing of the toroidal body at temperatures of 900° C. to 950° C. and a subsequent quenching in water, oil or air. In addition, the step of stress-annealing includes heating of the toroidal body to a temperature of about 600° C. and a subsequent cooling in air.

The method may use an apparatus which comprises a turntable for mounting of a toroidal body thereon, a means for tilting the turntable, a curved outrigger and a weld-cladding means mounted on the outrigger. The turntable is rotatably mounted on a pivot axis while the tilting means is constructed to rotate the turntable 360° about a horizontal axis passing perpendicularly through the pivot axis of the turntable. The curved outrigger is secured to this means and has a center of curvature located on the pivot axis of the turntable. The weld-cladding means is mounted on the outrigger for rotation in a vertical plane relative to the outrigger. In addition, the weld-cladding means is disposed in a common vertical plane with the pivot axis of the turntable for disposition within a toroidal body mounted on the turntable and a radius of curvature corresponding to the curved outrigger.

The outrigger is detachably secured to the tilting means to permit replacement by outriggers of different curvatures. This permits toroidal bodies with different curvatures to be weld-cladded on the apparatus. In addition, a means is provided for adjusting the outrigger relative to the pivot axis of the turntable and to the plane of the turntable. This permits the outrigger to be adapted to toroidal bodies of different cross-section diameters and/or wall thicknesses.

The weld-cladding means is also detachably mounted on the outrigger and, as such, facilitates the adjustment of the outrigger and the setting of the axis of rotation of the weld-cladding device relative to the core or longitudinal axis of the toroidal body. In this regard, the pivot axis of the weld-cladding means on the outrigger is disposed in coincidence with the longitudinal axis of the toroidal member, i.e., in the center of the circle generating the toroidal body in each cross-section of the body.

Figure 2:
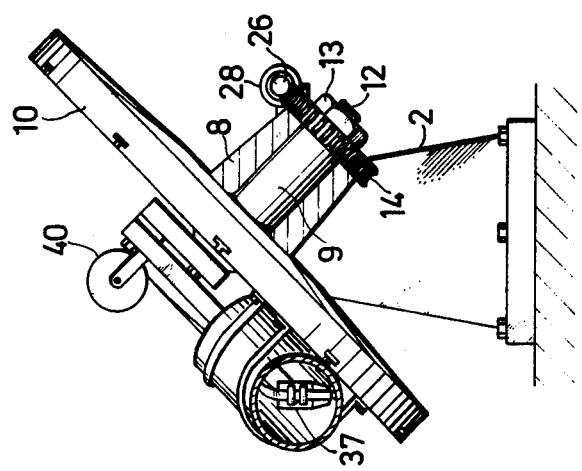

These and other objects and advantages of the invention will become more apparent from the following detailed description and accompanying drawings in which:

FIG. 1 illustrates an elevational view of an apparatus for performing a method of weld-cladding a pipe elbow in accordance with the invention; and FIG. 2 illustrates a view taken on line II—II of FIG. 1.

Referring to FIG. 1, the apparatus for internally welding a toroidal body such as a pipe elbow 11 has a pair of pillow blocks 2, 3 in which a tilting means 4 is rotatably mounted via bearings 1. As shown, this tilting means 4 has a pair of side plates 5, 5' in which journals 6, 6' are mounted and journalled in the bearings 1. In addition, the tilting means has a yoke 7 which extends between the side plates 5, 5'. The center of the yoke 7 is provided with an eye 8 (FIG. 2) on an axis parallel to the principal direction of the side plates 5, 5'.

In addition, the apparatus has a turntable 10 which is rotatably mounted via a pivot shaft 9 in the eye 8 of the yoke 7. Further, the pivot shaft 9 is stepped at the free end and provided with a thread 12 (FIG. 2) which projects beyond the yoke 7. In order to rotate the turntable 10 relative to the yoke 7, a worm gear 14 is mounted on the reduced end of the pivot shaft 9 is abutment with a shoulder (not shown) of the shaft 9 and is secured against rotation by a key (not shown) and against displacement by a nut 13 threaded onto the thread 12. The worm gear 14 which is thus rotatable about the axis of the shaft 9 meshes with a worm 26 of a reduction motor 28 mounted on the yoke 7 is suitable manner. This motor 28 is program-controlled in a manner (not shown), for example, by a computer.

The height of the pillow blocks 2, 3 and the tilting means 4 are such that the turntable 10, including the super structures secured thereon and on the side plate 5', as described below, can be turned through an angle of 360° about the horizontal axis of the journals 6, 6'. This horizontal axis also passes perpendicularly through the pivot axis of the turntable 10 so that during the tilting of the turntable 10, the axis of the pivot shaft 9 executes one revolution in a vertical plane 22.

As shown in FIG. 1, the turntable 10, has a central cutout 20 and a plurality (e.g. 10) of radial mounting slots 21 for clamping of a toroidal body 11 to be weld-cladded thereon.

As shown, contrary to the journal 6, the journal 6' extends beyond the bearing of the pillow block 2. This extension carries a worm gear 25 which is secured to the journal 6', for example by means of a key. In order to rotate the tilting means 4 about the horizontal axis, the worm gear 25 engages a worm 27 of a reduction motor 29. This reduction motor 29 is programcontrolled in a manner similar to the reduction motor 28.

A curved outrigger 35 is detachably secured to the tilting means 4 about a center of curvature located on the pivot axis of the pivot shaft 9. In addition, a means is provided for adjusting the outrigger 35 relative to the pivot axis and to the plane of the turntable 10. This means includes a plate 30 provided with a slot 31 through which a screw 24 passes into the side plate 5' to hold the plate 30 on the side plate 5' and a slotted arm 34 of the outrigger 35. The slotted arm 34 is fastened on the plate 30 by means of a screw 32 which threades into a region of the plate 30 outside of the slot 31. In addition, a spacer 33 is provided between the plate 30 and the arm 34. As shown, the outrigger 35 is curved over most of its length and has a radius of curvature corresponding to the radius of curvature of the toroidal body 11. For bodies 11 of different radii of curvature, differently curved outriggers 35 are provided. Accordingly, the mounting of the outriggers 35 to the tilting means 4 is made detachable to permit ready replacement.

A weld-cladding means 37 is detachably mounted on the outrigger 35 for rotation in a vertical plane relative to the outrigger 35. As shown, the weld-cladding means 37 is disposed at the free end of the outrigger 35 so as to be disposed in common with the pivot axis of the turntable 10 in the vertical plane 22. The mounting is such that the weld-cladding means 37 is rotatable relative to the turntable 10 and the tilting means 4. The weld-cladding means 37 receives welding material in ribbon form from a roll 40 which is rotatably mounted on the outrigger 35. Alternatively, in order to guide the ribbon in a simpler manner, the roll 40 may be disposed on an axis parallel to the pivot shaft 9 rather than in perpendicular relation as shown so that the surface of the ribbon is perpendicular to the turntable 10.

The spacer 33 between the plate 30 and arm 34 may consist of an electrically non-conductive material and the screw 32 can be surrounded by or underlayed with an insulator so as to provide a means for electrically insulating the outrigger 35 from the tilting means 4 and the turntable 10. In this case, welding current can be fed via the outrigger 35 to the weld-cladding means 37. This can be accomplished in any suitable manner and is not further described.

The weld-cladding means 37 can be controlled in synchronism with the reduction motor 29 in such a manner that the principal axis of the weld-cladding means 37 always remains vertical in space. However, it is also possible to reset the vertical position of the cladding means 37 in the vertical plane 22 prior to each operation thereof. This is always preceded by an incremental movement or step of the turntable 10 in the tilting direction.

As shown in FIG. 1, the toroidal body forms a 90° angle and is clamped to the turntable 10 by means of three clamps 42 in such a manner that the axis of curvature of the body 11 is coaxial with the pivot shaft 9. By shifting the plate 30 and the arm 34 in the ranges permitted by the slots, the outrigger 35 can be set so that the pivot point of the weld-cladding means 37 coincides with the longitudinal axis, i.e., the center of the circle generating the toroidal surface of the shaped body 11. Thus, when the table 10 rotates, the pivot point of the weld-cladding means 37 is always located on the core axis 23 of the body 11 as the body 11 rotates about the axis of the pivot shaft 9.

In order to fabricate a toroidal body such as a pipe elbow 11, the following steps are carried out. First, two torus-sector half-shells are fabricated from suitably cut sheets in a known manner by die forging. These half-shells are then machined at the longitudinal edges, i.e., prepared for a subsequent welding operation, for instance, by deburring and cleaning the edges so as to provide the edges with a surface suitable for welding. The surfaces are then welded together to form a toroidal body of the two half-shells. In order to remove any deformation that may have occurred during welding, the toroidal body 11 is then straightened out and subsequently heat treated for tempering or removal of stresses due to the straightening operation. This heat treatment consists of annealing of the toroidal body at temperatures of 900° C. to 950° C. and a subsequent quenching in water, oil or air.

Thereafter, the toroidal body is aligned on the turntable 10 with the axis of the curvature of the body 11 parallel to the axis of the pivot 9. The body 11 is then fastened by means of the clamps 42. Unless the outrigger 35 and the weld-cladding means 37 are already mounted and set up with the welding means 37 in the vertical plane 22, as would be the case in the fabrication of a number of elbows with the same shapes and dimensions, the outrigger 35 is selected according to the curvature of the toroidal body 11 and is mounted and adjusted on the side plate 5' by means of the plates 30, 31. The adjustment is such that the welding means 37 is located with its center of rotation in the vertical plane 22, and more specifically, in the center of the circle generating the toroidal body 11. During this adjustment, the welding means 37 can advantageously be removed from the outrigger 35 if the center of rotation of the welding means 37 is marked at the outrigger 35. The body 11, outrigger 35, and welding means 37 are then mutually aligned so that the pivot point of the weld-cladding means 37 is located on the core axis 23 of the toroidal body 11 when the turntable 10 rotates about the axis of the shaft 9. However, it is also possible to arrange the weld-cladding means 37 eccentrically of the axis of the shaft 9. This requires the pivot point to be reset after each incremental tilting of the turntable 10 in the tilting direction.

The cladding layer is then applied in incremental steps. To this end, the turntable 10 is rotated about the axis of the shaft 9 by an angle which corresponds at least to the angle defined by the toroidal body 11. This constitutes a working forward stroke during which material is applied. The turntable is then rotated in the opposite direction. This constitutes an idle reverse stroke during which material is not applied. Between each two working strokes, the inclination of the turntable 10 is changed in the tilting direction in accordance with the width of the cladding. This is carried out by an incremental tilting of the table 10 about the axis of the journals 6, 6' via the reduction motor 29 and gears 27, 25. During this time, the position of the weld-cladding means 37 is automatically changed relative to the outrigger 35 in the opposite direction or must be readjusted by hand so that the cladding means 37 retains a vertical position for each working stroke. If required, a welding powder funnel which is provided at the welding means 37 can be refilled between the two working strokes. Alternatively, an automatic feed for the powder may be provided.

After applying the weld-clad along the tangential generatrix lines on the inside of the toroidal body, the body 11 is stress-annealed. This step can be accomplished by heating the finished pipe elbow or toroidal body 11 to about 600° C. and subsequently cooling the elbow in air.

What is claimed is:

1. A method of internally weld-cladding a toroidal body, said method comprising the steps of
    forming a pair of torus-sector half-shells;
    machining the edges of each half-shell;
    subsequently welding the half-shells together into a toroidal body;
    straightening and heat treating the toroidal body;
    thereafter applying a weld-clad along tangential generatrix lines on the inside of the toroidal body; and
    subsequently stress-annealing the weld-cladded toroidal body.

2. A method as set forth in claim 1 wherein said step of heat treating includes annealing of the toroidal body at temperatures of 900° C. to 950° C. and subsequent quenching in one of water, oil and air and said step of stress-annealing includes heating of the toroidal body to a temperature of about 600° C. and subsequent cooling in air.

* * * * *